United States Patent [19]

Weber

[11] Patent Number: 5,037,175
[45] Date of Patent: Aug. 6, 1991

[54] CLIP FOR DRESSING OF FIBER OPTIC CABLE WITHIN CONFINED SPACE

[75] Inventor: Robert N. Weber, Hummelstown, Pa.

[73] Assignee: AMP Incorporated, Harrisburg, Pa.

[21] Appl. No.: 535,937

[22] Filed: Jun. 11, 1990

[51] Int. Cl.⁵ .............................................. G02B 6/36
[52] U.S. Cl. ...................................................... 385/76
[58] Field of Search ................ 350/96.20, 96.21, 96.22

[56] References Cited

U.S. PATENT DOCUMENTS

| | | | |
|---|---|---|---|
| 4,167,303 | 9/1979 | Bowen et al. | 350/96.21 |
| 4,203,004 | 5/1980 | Cox | 174/135 |
| 4,611,887 | 9/1986 | Glover et al. | 350/96.21 |
| 4,652,082 | 3/1987 | Warner | 350/96.2 |
| 4,687,291 | 8/1987 | Stape et al. | 350/96.22 X |
| 4,772,081 | 9/1988 | Borges et al. | 350/96.20 |
| 4,787,706 | 11/1988 | Cannon, Jr. et al. | 350/96.20 |
| 4,850,669 | 7/1989 | Welker et al. | 350/96.20 |
| 4,979,792 | 12/1990 | Weber et al. | 350/96.2 |

Primary Examiner—William L. Sikes
Assistant Examiner—Phan T. Heartney

[57] ABSTRACT

A connector 6 for joining light transmitting fiber cables to a transmitter 2 and/or receiver 3 devices and/or cables, comprises a connector assembly 5, an optical fiber cable 7 and a clip 8. The connector assembly 5 has at least one profiled passageway 11A extending therethrough from a mating face 15, 16 to a cable receiving end 43. The optical fiber cable is in part encompassed thereby. The optical fibers 12, 13 of cable 7 extend from the mating face 15, 16 to a first intermediate section 42 at the cable 7 receiving end 43 of the connector assembly 5 and then therethrough to project away from the connector assembly 5 to at least a second intermediate section 44. A clip 8 has a curved bracket body 45 with first 46 and second 47 yoke ends. The first yoke end 46 encircles the cable 7 at the first intermediate section 42, and the second yoke end 47 encircles the cable 7 at a second intermediate section 44 and maintains the cable 7 along the arc of the curvature of the bracket body 45.

9 Claims, 3 Drawing Sheets

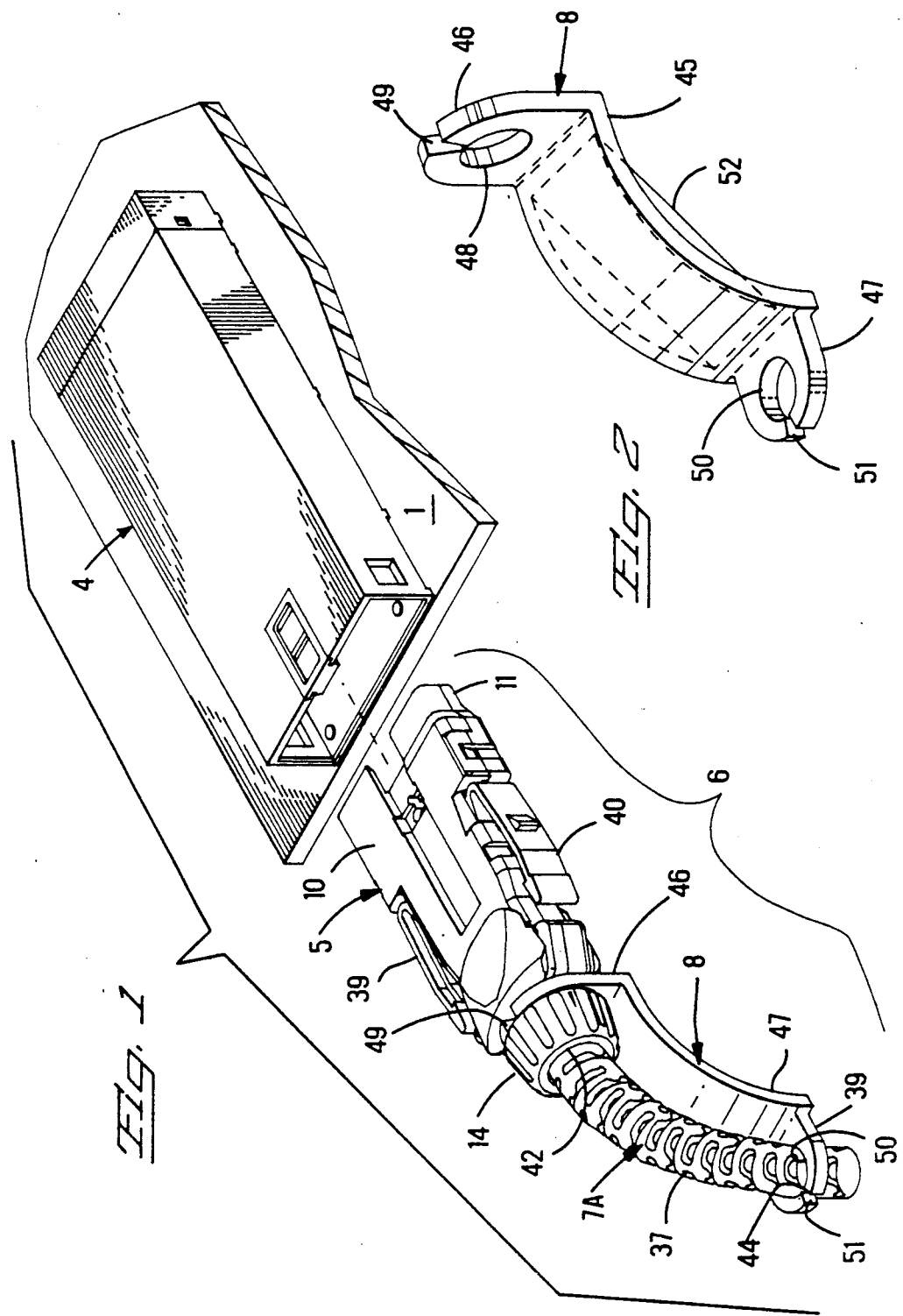

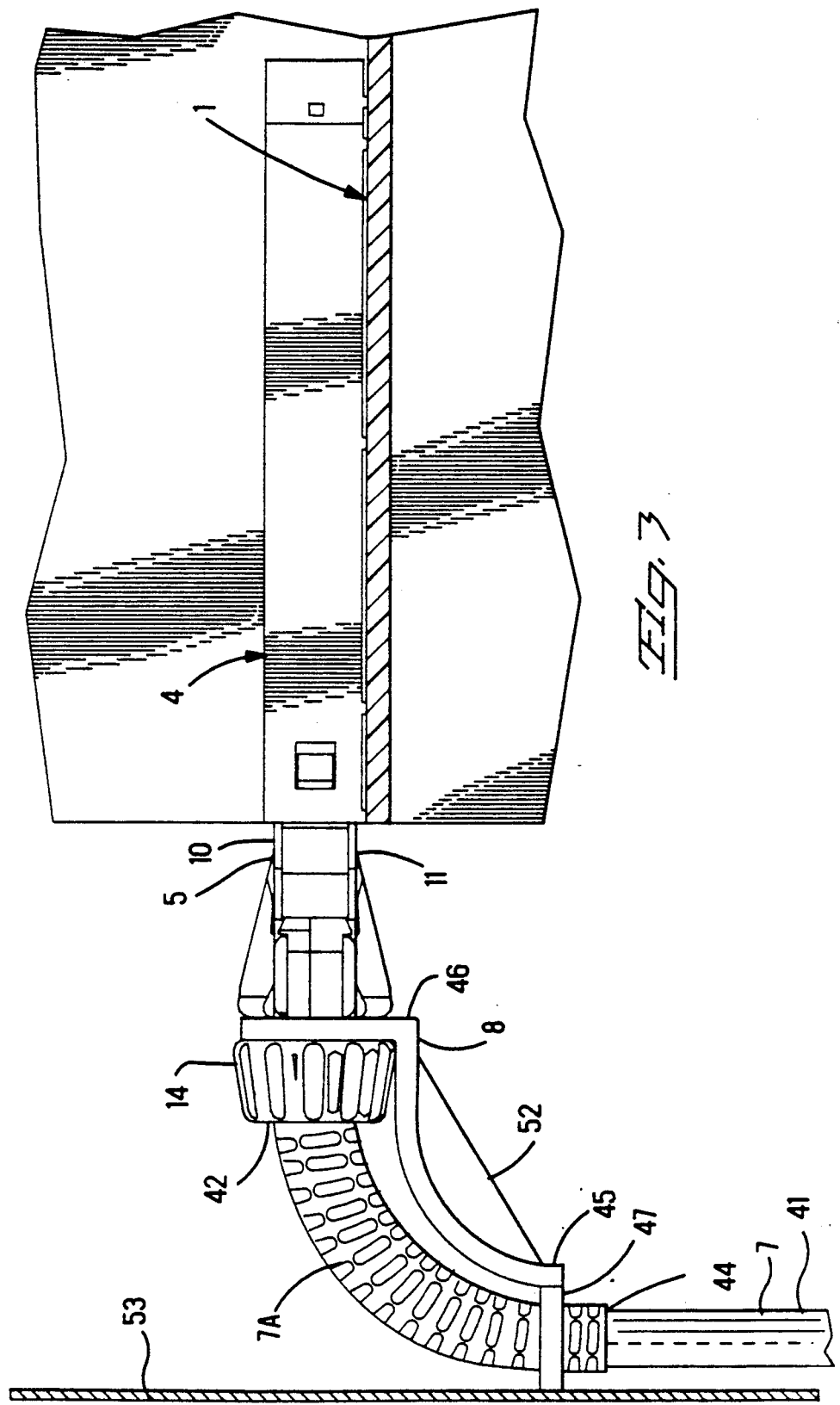

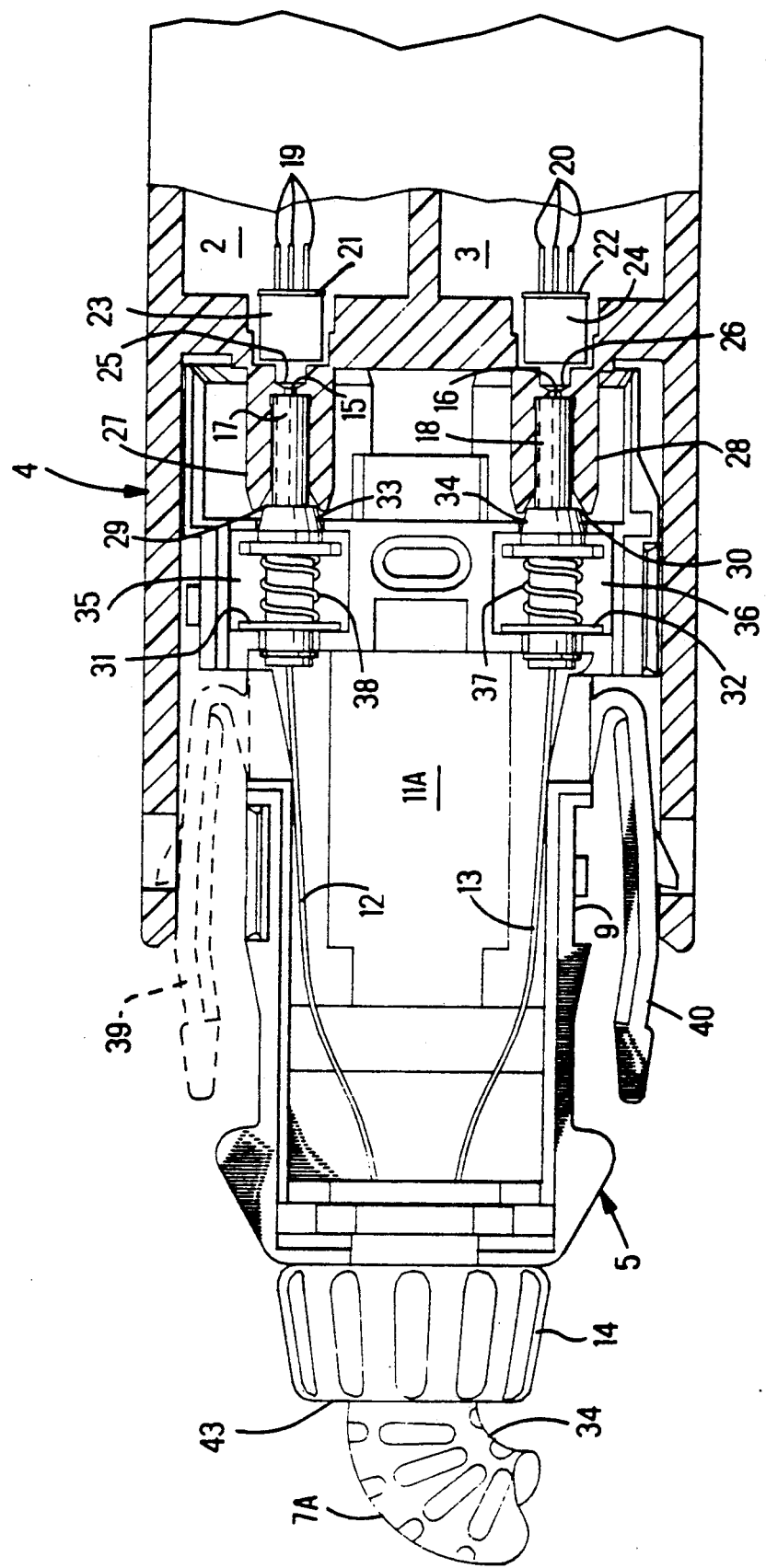

CLIP FOR DRESSING OF FIBER OPTIC CABLE WITHIN CONFINED SPACE

FIELD OF THE INVENTION

The present invention relates to optical fiber connectors for optical communications applications and, more particularly, to a clip having curved bracket body with yoke ends for the dressing of fiber cable within confined space.

BACKGROUND OF THE INVENTION

The present invention relates to a connector for joining light transmitting fiber cables to transmitter and/or receiver devices and/or like cables. In constructing such connectors, it is important to project the fiber cable away from the connection in a manner that will not overstress or kink the buffered fiber. Overstressing or kinking may interfere with the signal transmitting characteristics of the fiber. However, it is not always possible to project the cable lineally away from the connection and in the same plane as the connection in applications requiring connection in tight quarters. Thus, for example, oftentimes connection must be made to a transceiver located to the rear of a computer and toward the wall which requires dressing of the cable at an angle—indeed, at times a severe angle—to the plane of the connection.

The present invention permits dressing cables from fiber optic connections at angles to the plane of the connection but without overstressing or kinking the buffered fiber to provide an improved strain relief and to maintain the travel of the cable from the connection area within required minimum bend radius parameters.

The present invention has applicability to a wide range of connectors, including connector assemblies for fixed shroud duplex systems, single mode and multimode bayonet type connectors and the like. The present invention relates to a clip for the connector of Bowen, et al, U.S. Pat. No. 4,167,303, wherein the connector assembly includes a housing with at least one cable receiving bore therein; an assembly including an annular crimping ring, a profiled ferrule member, and a helical spring member secured to an end of each cable; and a cap member securing the ferrule members in the housing member in a spring loaded condition.

Further, the present invention is applicable as part of a connector including a connector assembly such as that disclosed by Glover, et al, U.S. Pat. No. 4,611,887, in which the connector assembly comprises a housing member having a passageway extending therethrough. Further included is a receptacle connector member latchably mounted to the passageway and having therein fiber optic connectors terminated to ends of fiber optic transmission members and to said portion of optical fiber cable. The fiber optic connectors are mounted in the receptacle connector member as spring biased connectors with profiled resilient front ends of the connectors disposed in profiled bores of alignment ferrules that are floatably mounted in the receptacle connector member. Further included is a plug connector member having mounted therein spring biased fiber optic connectors terminated to ends of fiber optic transmission members. Latch members on the plug connector member latchably secure the plug connector member in the housing member with profiled resilient front ends of the fiber optic connectors being disposed in the profiled bores of the alignment ferrules thereby connecting the respective fiber optic transmission members together under spring force.

Further, the present invention may be used in a connector such as that where the connector assembly comprises a shell encircling a spring biased holder for an optical fiber, a sheath to prevent leaking of adhesive from the holder, and wherein the strength members of the optical fiber cable are anchored to the shell. The holder and the optical fiber of the cable are displaceable with respect to the strength members of the cable.

Another example of a connector which may be included as part of the present invention is that in which the connector assembly comprises an alignment ferrule having a central passage for aligning an optical fiber of an optical fiber cable, and a rear end for connection to an optical fiber cable. A radially enlarged collar surrounds the ferrule which has a circumferential groove. A coupling nut is moveable axially over the ferrule. There is a clearance between the coupling nut and the collar in which the collar is retracted to compress a spring. The spring is located for direct compression in engagement against the rear transverse face of the collar. The ferrule is unitary with the transverse front face and the rear face of the collar. The ferrule and the collar are molded from a rigid plastic material, and the collar includes mold gate flash on the molded plastic material only at locations along the clearance between the collar and the coupling nut.

SUMMARY OF THE INVENTION

The present invention relates to a connector for joining light transmitting fiber cables to transmitter and/or receiver devices and/or cables wherein a clip is provided to permit acute angle dressing of the fiber cable of the connector from the point of connection. The connector of the present invention comprises a connector assembly having at least one profiled passageway extending therethrough from a mating face to a cable receiving end. Additionally included is an optical fiber cable having at least a portion encompassed by the connector assembly. The fiber of the cable extends therethrough the profiled passageway of the connector assembly from the mating face to a first intermediate section of the cable at the cable receiving end of the connector assembly and thence therethrough to project away from connector assembly to at least a second intermediate section of the cable. The connector of the present invention is particularly characterized as including a clip which has a curved bracket body with a first and a second yoke end. The first yoke end encircles the cable at the first intermediate section, and the second yoke end encircles the cable at the second intermediate section and maintains the cable along the arc of the curvature of the bracket body.

The connector additionally may comprise a strain relief boot encircling at least a portion of the fiber cable with a first end section of the strain relief boot encircling at least a portion of the assembly at the cable receiving end and the cable at the first intermediate section. The strain relief boot projects away from the assembly and encompasses the cable to terminate in a second end section encompassing the second intermediate section of the cable. With this embodiment, the yoke ends of the bracket body have a first yoke end encircling the strain relief boot at the first section and the second yoke end encircling the strain relief boot at the second end. The clip maintains the strain relief boot along the arc of the curvature of its bracket body.

The present invention has applicability to a wide range of connector assemblies, including the Bowen, et al connector assembly and the Glover, et al assembly.

BRIEF DESCRIPTION OF THE DRAWINGS

FIG. 1 is a perspective view of a connector for optical cable for disconnect connection with an optical connector mounted on a circuit board together with an optical detector and an optical emitter.

FIG. 2 is a perspective view of the clip of the present invention showing part of its molded arc secant reinforcing portim in phantom.

FIG. 3 is a side elevation of the connector and optical connector mounted on a circuit board of FIG. 1.

FIG. 4 is a sectional view of the connector assembly shown in FIGS. 1 and 3.

DESCRIPTION OF A PREFERRED EMBODIMENT

Referring to FIGS. 1, 2, 3 and 4, is shown a portion of a printed circuit board 1 of a type found internally of an item of optical equipment, not shown, that has an optical transmitter 2 and an optical receiver 3. Transceiver adapter assembly 4 mounted on the circuit board 1 is constructed for disconnect coupling with complementary connector assembly 5 provided with optical fiber cable 7 that is part of a communications system, not shown, to which the transmitter 2 and receiver 3 are coupled for optical communications with other items of the system.

Connector assembly 5 is part of a connector 6 which includes the assembly 5, optical fiber cable 7, strain relief boot 7A and clip 8. Connector assembly 5 is constructed for disconnect coupling through means of adapter assembly 4. Connector assembly 5 includes an alignment fixture 9 which is a hollow body of molded upper cover 10 and molded lower cover 11. The covers 10 and 11 are of insulated plastic material formed by molding into shape that has an exterior with dimensions that intermate with the optical transmitter 2 and optical receiver 3 via adapter assembly 4. Both the upper cover 10 and the lower cover 11 are complementarily contoured in their interiors so as to form a profiled passageway 11A shaped to encompass and hold in place optical fibers 12 and 13 as is hereinafter described.

Upper cover 10 of alignment fixture 9 intermates with lower cover 11 by snap-in connection. Connector assembly 5 is shown with threaded cap 14 for securing upper cover 10 together with lower cover 11 to encompass and provide an enclosure for optical fibers 12 and 13.

Further, with reference to FIG. 4 is shown optical fibers 12 and 13 engaged with transceiver adapter assembly 4. Ends of optical fibers 12 and 13 are enclosed by plugs 17 and 18 leaving exposed fiber faces 15 and 16.

Transmitter 2 includes leads 19 from the circuitry of the printed circuit board 1, active device 21, such as a light emitting diode (LED), chamber 23, lens or mirror 25, ferrule-shaped mount 27, and mount bore 29. Optical receiver 3 is shown with leads 20 from the printed circuit board active device detector 22, chamber 24, lens or mirror 26, ferrule-shaped mount 28, and mount bore 30. Device mount 27 with through-bore 29 receives plug 17 for mating with accurate alignment of fiber face 15 to the lens or window 25 of emitter 4.

Device mount 28 with through-bore 30 receives plug 18 for mating with the accurate alignment of fiber face 16 to lens or window 26 of detector 5. Rear flanges 31 and 32 and truncated, cone-shaped, lead-in sections 33 and 34 are formed so as to nestle within complementary cavities formed at 35 and 36 by the closure of upper cover 10 and lower cover 11. Springs 37 and 38 bias the lead-in sections 33 and 34 to form secure fits within cavities 35 and 36. The connector assembly 5 is secured within the adapter assembly 1 by biased spring fit of latch 39 and latch 40 against the inner walls of the adapter assembly 6.

Optical fiber cable 7 is a dual fiber including optical fibers 12 and 13 and individual tight buffer surrounded by strength members and a protective outer jacket 41 encompassing the inner constructions. Outer jacket 41, strength members and buffer have been stripped away from a portion of the cable to first intermediate section 42. The exposed optical fibers 12 and 13 are disposed within the alignment fixture 9 extending through the passageways indicated as bores 29 and 30 through the fixture 9 to the cable receiving end 43 of the alignment fixture 9. The optical fibers 12 and 13 converge into dual fiber cable 7 which projects away from the connector assembly 5 to a second intermediate section designated 44.

Referring to FIGS. 1, 2, and 3, is shown the clip 8 of the present invention which, in this embodiment, includes a curved bracket body 45 which may be stamped or molded with first yoke 46 and second yoke 47. First yoke 46 is characterized by port 48 to form an annular disc for receiving a fiber cable 7 or strain relief boot 7A and cable 7 and notch 49 for providing biased yoke fit of port 48 to the cable 7 or boot 7A. Second yoke end 47 has port 50 to form an annular disc and notch 51 serving the same function at a second location of the cable or boot. In this embodiment, the bracket body 45 is reinforced by solid arc-shaped piece 52 defined by the curvature of the bracket 45 and secant thereto. The clip 8 provides a 90 degree bend to the cable 7 without exceeding the min bend radius of the cable said 7. Otherwise, the cable could be subjected to crimping or kinking as it would be dressed from the connector assembly 5 rearwardly and downwardly within the confined space defined by wall 45 as shown in FIG. 3. The clip 8 of the present invention prevents such crimping or kinking. It is notable that, in this embodiment, the clip 8 is shown dressing the optical fiber cable 7 away from the connector assembly 5 and downwardly 90 degrees to the plane of the connector assembly 5. It is notable that the clip is rotatable 360 degrees around the pivot of a center point to threaded cap 14 so that the clip 8 of the present invention is capable of dressing the optical fiber cable 7 at numerous orientations away from the connector assembly 5.

In constructing a connector 6 of the present invention, an end of optical fiber cable 7 is strung through port 50 of second yoke end 47 of the clip 8. Threaded cap 14 is then fitted around the cable followed by stringing of the cable through port 48 of the first yoke end 46 of clip 8. A section of the optical fiber cable 7 is stripped of its outer jacket 41, strength members (not shown) and buffer (not shown) and is aligned within connector assembly 5 with the faces 15 and 16 of the fibers 12 and 13 respectively coupled to the transmitter 2 and receiver 3. The covers 10 and 11 of the assembly are fitted one to the other and the first yoke end 38 of clip 8 is advanced to the first intermediate section 42 of the cable 7 at the cable receiving end 43 of the connector assembly 5 with the notch 49 of the second yoke end 47 of the clip 8 fitting around the second intermediate section 36 of the cable 7. Cap 14 is then threaded to the threaded end (not shown) of the connector assembly 5 to secure the cable 7 and clip 8 to the assembly 5 with the cable 7 rigidly dressed away from the connector 5 along an arc that provides a 90 degree projection of the cable from the rear of the device.

While what has been described constitutes a presently preferred embodiment of the invention, it should be recognized that the clip 8 may take other forms so long as it consists of a curved bracket body 44 with first and second yoke ends. Further, it should be recognized that the connector of the present invention may include other types of connector assemblies including connector assemblies for fiber to fiber connections. Accordingly, it should be understood that the invention is to be limited only insofar as required by the scope of the following claims.

What is claimed is:

1. A connector for joining light transmitting fiber cables to transmitter and/or receiver devices and/or cables, comprising a connector assembly having at least one profiled passageway extending therethrough from a mating face to a cable receiving end; optical fiber cable with at least a portion thereof extending therethrough said profiled passageway of the connector assembly from said mating face to a first intermediate section of the cable at the cable receiving end of said connector assembly and thence therethrough to project away from said connector assembly to at least a second intermediate section of the cable, and further comprising;

a clip having curved bracket body with first and second yoke ends, said first yoke end encircling said cable at said first intermediate section and the said second yoke end encircling said cable at said second intermediate section and maintaining the cable along the arc of the curvature of said bracket body.

2. The connector of claim 1, additionally comprising a strain relief boot encircling at least a portion of said fiber cable and with a first end section encircling at least a portion of the assembly at the cable receiving end and, further, said cable at said first section and said strain relief boot projecting away from said assembly and encompassing the cable to terminate in a second end section encompassing the second intermediate section of said cable, and, wherein yoke ends of said bracket body have first yoke end encircling said strain relief boot at said first section and second yoke end encircling said strain relief boot at said second end to maintain said strain relief boot along the arc of curvature of the bracket body.

3. The connector of claim 1 wherein the clip further includes molded arc providing reinforcing portion along the concave arc side of said curved bracket body.

4. The connector of claim 1 where yoke end is an annular disc with notch to receive said strain relief boot section.

5. The connector of claim 3 where yoke end extends ninety degrees from the plane of the curved bracket body at point of joinder of yoke to said body.

6. The connector of claim 1 or claim 2 wherein the connector assembly comprises;

a housing member having a passageway extending therethrough;

a receptacle connector member latchably mounted in the passageway and having therein fiber optic connectors terminated to ends of fiber optic transmission members and said portion of optical fiber cable, said fiber optic connectors mounted in the receptacle connector member as spring biased connectors with profiled resilient front ends of the connectors disposed in profiled bores of alignment ferrules that are floatably mounted in said receptacle connector member;

plug connector member having mounted therein spring biased fiber optic connectors terminated to ends of fiber optic transmission members;

latch members on said plug connector member for latchably securing the plug connector member in the housing member with profiled resilient front ends of the fiber optic connectors being disposed in the profiled bores of the alignment ferrules thereby connecting the respective fiber optic transmission members together under spring force.

7. The connector of claim 1 or claim 2 wherein the connector assembly comprises a shell encircling a spring biased holder for said portion of optical fiber cable, a sheath, and wherein said fiber cable has strength members which are anchored to the shell and said holder and said portion of fiber cable are displaceable with respect to the strength members of said cable.

8. The connector of claim 1 or claim 2 wherein the connector assembly comprises an alignment ferrule having a central passage for aligning the said portion of optical fiber cable and a rear end for connection to said optical fiber cable; a radially enlarged collar surrounding the ferrule and having a circumferential groove; a coupling nut moveable axially over the ferrule; a spring for compression directly in engagement against the rear face of the collar, said coupling nut and said collar forming a clearance in which the collar may be retracted to compress said spring, said ferrule being unitary with the transverse front face and the rear face of said collar.

9. The connector of claim 1 or claim 2 wherein the connector assembly includes a housing with at least one cable receiving bore therein and annular crimping ring, a profiled ferrule member and a helical spring member secured to an end of said fiber cable; and a cap member securing the ferrule members in the housing member in a spring loaded condition.

* * * * *